US008163665B2

(12) United States Patent
Uehara et al.

(10) Patent No.: US 8,163,665 B2
(45) Date of Patent: *Apr. 24, 2012

(54) OPTICAL GLASS

(75) Inventors: Susumu Uehara, Sagamihara (JP); Koji Shimizu, Sagamihara (JP)

(73) Assignee: Ohara, Inc., Sagamihara-shi (JP)

( * ) Notice: Subject to any disclaimer, the term of this patent is extended or adjusted under 35 U.S.C. 154(b) by 657 days.

This patent is subject to a terminal disclaimer.

(21) Appl. No.: 11/628,043

(22) PCT Filed: May 31, 2005

(86) PCT No.: PCT/JP2005/010300
§ 371 (c)(1),
(2), (4) Date: Dec. 11, 2007

(87) PCT Pub. No.: WO2005/118498
PCT Pub. Date: Dec. 15, 2005

(65) Prior Publication Data
US 2008/0220961 A1    Sep. 11, 2008

(30) Foreign Application Priority Data

Jun. 2, 2004   (JP) ................. 2004-164762

(51) Int. Cl.
C03C 3/068 (2006.01)
C03C 3/066 (2006.01)
(52) U.S. Cl. ............. 501/78; 501/79; 501/50; 501/51; 501/64; 501/901; 501/903
(58) Field of Classification Search ............... 501/50, 501/51, 64, 78, 79, 901, 903
See application file for complete search history.

(56) References Cited

U.S. PATENT DOCUMENTS

| 4,120,732 | A | 10/1978 | Komorita et al. |
| 4,166,746 | A | 9/1979 | Ishibashi et al. |
| 4,390,638 | A | 6/1983 | Mennemann et al. |
| 4,472,511 | A | 9/1984 | Mennemann et al. |
| 4,584,279 | A | 4/1986 | Grabowski et al. |
| 4,612,295 | A | 9/1986 | Sagara |
| 4,732,876 | A | 3/1988 | Nagamine et al. |
| 6,187,702 | B1 | 2/2001 | Morishita |
| 6,333,288 | B1 | 12/2001 | Clement et al. |
| 6,413,894 | B1 | 7/2002 | Sato |
| 6,468,935 | B1 | 10/2002 | Mori et al. |
| 6,558,316 | B2 | 5/2003 | Kikuchi et al. |
| 6,599,852 | B2 | 7/2003 | Kondo et al. |
| 6,818,578 | B2 * | 11/2004 | Tachiwama ............. 501/78 |
| 6,912,093 | B2 * | 6/2005 | Endo ..................... 359/642 |
| 7,091,145 | B2 | 8/2006 | Wolff et al. |
| 7,138,349 | B2 * | 11/2006 | Uehara et al. ........... 501/78 |
| 7,335,614 | B2 * | 2/2008 | Uehara et al. ........... 501/78 |
| 7,491,667 | B2 * | 2/2009 | Hayashi ................. 501/51 |
| 7,659,222 | B2 * | 2/2010 | Shimizu ................. 501/78 |
| 2002/0006857 | A1 * | 1/2002 | Tachiwama ............. 501/78 |
| 2003/0032542 | A1 | 2/2003 | Endo |
| 2003/0038177 | A1 | 2/2003 | Morrow |
| 2003/0040422 | A1 | 2/2003 | Kikuchi et al. |
| 2003/0046472 | A1 | 3/2003 | Morrow |
| 2003/0211929 | A1 * | 11/2003 | Hayashi et al. .......... 501/78 |
| 2004/0220041 | A1 * | 11/2004 | Isowaki et al. .......... 501/78 |
| 2004/0235638 | A1 * | 11/2004 | Uehara et al. ........... 501/78 |
| 2005/0049135 | A1 * | 3/2005 | Hayashi ................. 501/78 |
| 2005/0107240 | A1 | 5/2005 | Uehara |
| 2005/0223743 | A1 | 10/2005 | Hayashi |
| 2006/0229186 | A1 | 10/2006 | Uehara et al. |
| 2006/0234850 | A1 | 10/2006 | Hayashi et al. |
| 2009/0062101 | A1 * | 3/2009 | Uehara ................. 501/53 |
| 2009/0149307 | A1 * | 6/2009 | Shimizu ................. 501/78 |

FOREIGN PATENT DOCUMENTS

| CN | 1326904 | A |   | 12/2001 |
| DE | 2653581 | A1 |   | 6/1977 |
| EP | 1245544 | A2 |   | 10/2002 |
| JP | 52-129716 | A |   | 10/1977 |
| JP | 53-042328 | B |   | 11/1978 |
| JP | 53-047368 | B |   | 12/1978 |
| JP | 53-144913 | A |   | 12/1978 |
| JP | 54-002646 | B |   | 2/1979 |
| JP | 54-006241 | B |   | 3/1979 |
| JP | 54-006242 | B |   | 3/1979 |
| JP | 54-90218 | A |   | 7/1979 |
| JP | 60-51623 | A |   | 3/1985 |
| JP | 60-221338 | A |   | 11/1985 |
| JP | 60221338 | A | * | 11/1985 |
| JP | 62-100449 | A |   | 5/1987 |
| JP | 4-104918 | A |   | 4/1992 |
| JP | 08-217484 | A |   | 8/1996 |
| JP | 11-278865 | A |   | 10/1999 |
| JP | 2001-348244 | A |   | 12/2001 |
| JP | 2002-284542 | A |   | 10/2002 |
| JP | 2003-201142 | A |   | 7/2003 |

(Continued)

OTHER PUBLICATIONS

Derwent Abstract 1985-319327 of JP 60-221338 A, Nov. 6, 1985.*
Derwent Abstract 1979-63717B of JP 54-090218 A, Jul. 17, 1979.*
Chinese Office Action dated Sep. 11, 2009, issued in corresponding Chinese Patent Application No. 200580026286.
Taiwan Office Action dated Mar. 19, 2008, issued in corresponding Taiwan Patent Application No. 094118094.
International Search Report of PCT/JP2005/010300, date of mailing Jul. 26, 2005.
Chinese Office Action dated Jan. 19, 2007, issued in corresponding Chinese Patent Application No. 2005100742801.
Chinese Office Action dated Jan. 19, 2007, issued in corresponding Chinese Patent Application No. 2005100742801.
Chinese Office Action dated Sep. 17, 2010, issued in corresponding Chinese Patent Application No. 201010140753.4.
Chinese Office Action dated Dec. 12, 2011, issued in corresponding Chinese Patent Application No. 200710138342.X.
European Office Action dated Jun. 8, 2009, issued in corresponding European Patent Application No. 05104258.8.

(Continued)

Primary Examiner — Karl Group
Assistant Examiner — Elizabeth A Bolden
(74) Attorney, Agent, or Firm — Westerman, Hattori, Daniels & Adrian, LLP

(57) ABSTRACT

An optical glass having refractive index (nd) exceeding 1.85, Abbe number (vd) of 36 or over, comprising $SiO_2$, $B_2O_3$, $La_2O_3$, $Gd_2O_3$, $Ta_2O_5$ and $Li_2O$ as essential components, being free of Pb and As components, and having glass transition temperature (Tg) of 630° C. or below.

10 Claims, No Drawings

FOREIGN PATENT DOCUMENTS

| | | |
|---|---|---|
| JP | 2003-252647 A | 9/2003 |
| JP | 2003-267748 A | 9/2003 |
| JP | 2004-175632 A | 6/2004 |
| JP | 2005-015302 A | 1/2005 |
| JP | 2005-298262 A | 10/2005 |
| TW | 550244 B | 9/2003 |
| TW | 200403197 B | 3/2004 |
| TW | 1220964 B | 9/2004 |
| TW | 1228110 B | 2/2005 |
| WO | WO 2004/054937 A1 | 7/2004 |

OTHER PUBLICATIONS

European Office Action dated Aug. 24, 2011, issued in corresponding European Patent Application No. 05104258.8.
European Office Action dated Oct. 16, 2006, issued in corresponding European Patent Application No. 05104258.8.
Final Office Action dated Apr. 29, 2011, issued in corresponding U.S. Appl. No. 12/316,777.
Final Office Action dated Feb. 4, 2011, issued in corresponding U.S. Appl. No. 12/316,777.
Taiwanese Office Action dated Dec. 30, 2008, issued in corresponding Taiwanese Patent Application No. 094116923.
Non-Final Office Action dated Jun. 13, 2008, issued in corresponding U.S. Appl. No. 11/133,500.
Non-Final Office Action dated Oct. 5, 2009, issued in corresponding U.S. Appl. No. 12/316,777.
Taiwanese Office Action dated May 29, 2008, issued in corresponding Taiwanese Patent Application No. 094116923.
Japanese Office Action dated Jul. 27, 2010, issued in corresponding Japanese Patent Application No. 2005-153792.
European Search Report dated Oct. 28, 2005, issued in corresponding European Patent Application No. 05104258.8.
Japanese Office Action dated Oct. 12, 2010, issued in corresponding Japanese Patent Application No. 2005-141025.
Japanese Office Action dated Jun. 28, 2011, issued in corresponding Japanese Patent Application No. 2005-141025.
Final Office Action dated Mar. 20, 2009, issued in corresponding U.S. Appl. No. 11/133,500.
Japanese Office Action dated Dec. 7, 2010, issued in corresponding Japanese Patent Application No. 2005-153792.

* cited by examiner

OPTICAL GLASS

TECHNICAL FIELD

This invention relates to an optical glass which has a low glass transition temperature (Tg) and a high-refractive low-dispersion property, is excellent in chemical durability, particularly acid resistance measured in accordance with ISO method, has good internal transmittance and superior productivity of les preform and is suitable for precision mold pressing.

PRIOR ART

There are spherical lenses and aspherical lenses as lenses used for constituting an optical system. Many spherical lenses are produced by lapping and polishing glass pressings obtained by reheat press molding glass materials. On the other hand, aspherical lenses are mainly produced by precision press molding, i.e., the method according to which lens preforms which have been softened by heating are press molded with a mold having a high precision molding surface and the shape of the high precision molding surface of the mold is transferred to the lens preforms.

In obtaining glass moldings such as aspherical lenses by precision press molding, it is necessary to press lens preforms which have been softened by heating in a high temperature environment and, therefore, the mold used for such precision press molding is subjected to a high temperature and, moreover, a high pressing force is applied to the mold. Hence, in heating and softening the lens preforms and press molding the lens preforms, the molding surface of the mold tends to be oxidized or eroded, or a release film provided on the molding surface tends to be damaged with the result that the high precision molding surface of the mold cannot be maintained or the mold itself tends to be damaged. In such a case, the mold must be replaced and, as a result, frequency of replacement of the mold increases and production of products at a low cost on a large scale thereby cannot be achieved. Accordingly, glasses used for precision press molding are desired to have the lowest possible glass transition temperature (Tg) from the standpoint of preventing such damage to the mold, maintaining the high precision molding surface of the mold for a long period of time and enabling precision press molding at a low pressing force.

There are generally two kinds of manufacturing method of lens preforms. One is a method for producing the lens preform directly from molten glass by dripping method. The other is a method of producing the lens preform by lapping and polishing products obtained by reheat pressing a glass block or grinding glass block to a shape of a ball. In each method, for obtaining an optical glass which has no or very little striae or devitrification in shaping molten glass to a desired shape, it is necessary for the glass to have a certain degree of viscosity.

In conducting precision press molding, the glass of a lens preform needs to have a mirror surface or a surface close to a mirror surface. An optical glass for precision press molding generally has poor chemical durability and, in the case of processing a lens preform to a ball shape by lapping and polishing, fading is observed on the surface of the preform with the result that it becomes difficult to maintain a mirror surface or a surface close to it. In chemical durability, acid resistance measured in accordance with ISO method is particularly important.

From the point of view of usefulness in optical design, an optical glass having a high refractive index is demanded but such glass has the drawback that it has poor transmittance.

For these reasons, there is a high demand for an optical glass which has a high-refractive low dispersion property, a low transition temperature (Tg), an excellent acid resistance measured in accordance with ISO method, a high viscosity at liquidus temperature and excellent transmittance.

Particularly, a high-refractive, low dispersion optical glass having a refractive index (nd) exceeding 1.85 and an Abbe number (vd) of 36 or over is strongly demanded.

Since a high-refractive, low dispersion optical glass is very useful in optical design, various types of optical glasses have so far been proposed.

Japanese Patent Application Laid-open Publication No. Sho 60-22 1 3 3 8 and Japanese Patent Application Laid-open Publication No. Sho 62-100449 disclose optical glasses which have a low transition temperature (Tg). The glasses disclosed in these publications, however, do not satisfy the above described conditions required in optical design in recent years.

Japanese Patent Application Laid-open Publications No. Hei 8-217484, No. 2001-348224 and No. 2003-267748 specifically disclose optical glasses having the above described optical constants. These optical glasses disclosed specifically in the publications, however, do not satisfy the condition of $Ta_2O_5/Gd_2O_3$ in mass % being 1.9 or over and/or $Ta_2O_3/(Y_2O_3+La_2O_3+Gd_2O_3+Yb_2O_3)$ in mass % being 0.35 or over and, hence they are insufficient in either or all of acid resistance according to ISO method, internal transmittance, and viscosity at liquidus temperature.

WO2004-54937 discloses an optical glass which has a refractive index (nd) of 1.85 or over and a low glass transition temperature (Tg).

DISCLOSURE OF THE INVENTION

It is an object of the present invention to provide an optical glass which has comprehensively eliminated the drawbacks of the prior art optical glasses, has the above described optical constants and a low glass transition temperature (Tg), is excellent in acid resistance according to ISO method, has high viscosity at liquidus temperature and excellent transmittance and is suitable for precision press molding.

As a result of studies and experiments made by the inventors of the present invention for solving the above problems, an optical glass having the above described optical constants and a low glass transition temperature (Tg), is excellent in acid resistance according to the ISO method, has high viscosity at liquidus temperature and excellent transmittance and is suitable for precision press molding has been obtained by incorporating specific amounts of $SiO_2$, $B_2O_3$, $La_2O_3$, $Gd_2O_3$, $Ta_2O_5$ and $Li_2O$ in the glass.

In the first aspect of the invention, there is provided an optical glass having optical constants of a refractive index (nd) exceeding 1.85 and an Abbe number (vd) of 36 or over and comprising, as essential components, $SiO_2$, $B_2O_3$, $La_2O_3$, $Gd_2O_3$, $Ta_2O_5$ and $Li_2O$, being substantially free of Pb and As, and having glass transition temperature (Tg) of 630° C. or below.

In the second aspect of the invention, there is provided an optical glass as defined in the first aspect wherein water resistance of glass measured in accordance with Powder Method of Japanese Optical Glass Industrial Standard is Class 1 or Class 2, acid resistance of glass measured in accordance with Powder Method of Japanese Optical Glass Industrial Standard is Class 1 to Class 3 and acid resistance measured in accordance with ISO method is Class 1 to Class 4.

In the third aspect of the invention, there is provided an optical glass as defined in the first or second aspect wherein internal transmittance at wavelength of 400 nm is 90.0% or over and log η, the logarithm of viscosity η(dPa·s) at liquidus temperature, is 0.4 or over.

In the fourth aspect of the invention, there is provided an optical glass as defined in any of the first to third aspects wherein liquidus temperature is 1160° C. or below.

In the fifth aspect of the invention, there is provided an optical glass as defined in any of the first to fourth aspects wherein $Ta_2O_5/Gd_2O_3$ expressed in mass % calculated on oxide basis is 1.9 or over and/or $Ta_2O_5/(Y_2O_3+La_2O_3+Gd_2O_3+Yb_2O_3)$ expressed in mass % calculated on oxide basis is 0.3 or over.

In the sixth aspect of the invention, there is provided an optical glass as defined in any of the first to fifth aspects wherein $Ta_2O_5/(Y_2O_3+La_2O_3+Gd_2O_3+Yb_2O_3)$ expressed in mass % calculated on oxide basis is 0.3 or over and total amount of $La_2O_3$, $Gd_2O_3$, $Yb_2O_3$, $ZrO_2$, $Ta_2O_5$, $Nb_2O_5$ and $WO_3$ is 78% or below.

In the seventh aspect of the invention, there is provided an optical glass comprising in mass % calculated on oxide basis:

| | |
|---|---|
| $SiO_2$ | 0.1-8% |
| $B_2O_3$ | 5-less than 20% |
| $La_2O_3$ | 15-50% |
| $Gd_2O_3$ | 0.1-30% |
| $Ta_2O_5$ | exceeding 10% up to 25% and |
| $Li_2O$ | exceeding 0.5% and less than 3%. |

In the eighth aspect of the invention, there is provided an optical glass as defined in the seventh aspect comprising, as an optional component:

| | |
|---|---|
| $GeO_2$ | 0-10% and/or |
| $Yb_2O_3$ | 0-5% and/or |
| $TiO_2$ | 0-1% and/or |
| $ZrO_2$ | 0-10% and/or |
| $Nb_2O_5$ | 0-8% and/or |
| $WO_3$ | 0-10% and/or |
| ZnO | 0-15% and/or |
| RO | 0-10% |
| where RO is one or more components selected from MgO, CaO, SrO and BaO and/or | |
| $Sb_2O_3$ | 0-1% and/or |
| fluoride or fluorides of a metal element or elements contained in the above oxides, a total amount of F contained in the fluoride or fluorides being 0-6%. | |

In the ninth aspect of the invention, there is provided an optical glass as defined in any of the first to eighth aspects comprising in mass % calculated on oxide basis:

| | |
|---|---|
| $SiO_2$ | 0.1-8% |
| $B_2O_3$ | 5-less than 20% |
| $La_2O_3$ | 15-50% |
| $Gd_2O_3$ | 0.1-30% |
| $Ta_2O_5$ | exceeding 10% up to 25% |
| $Li_2O$ | exceeding 0.5% and less than 3% and |
| $GeO_2$ | 0-10% and/or |
| $Yb_2O_3$ | 0-5% and/or |
| $TiO_2$ | 0-1% and/or |
| $ZrO_2$ | 0-10% and/or |
| $Nb_2O_5$ | 0-8% and/or |
| $WO_3$ | 0-10% and/or |
| ZnO | 0-15% and/or |
| RO | 0-10% |
| where RO is one or more components selected from MgO, CaO, SrO and BaO and/or | |
| $Sb_2O_3$ | 0-1% and/or |
| fluoride or fluorides of a metal element or elements contained in the above oxides, a total amount of F contained in the fluoride or fluorides being 0-6%. | |

In the tenth aspect of the invention, there is provided an optical glass as defined in any of the first to eighth aspects further comprising 0 to less than 0.5% $Lu_2O_3$, 0 to less than 0.1% $Y_2O_3$ and 0-5% $Al_2O_3$.

In the eleventh aspect of the invention, there is provided a preform for precision press molding made of an optical glass as defined in any of the first to tenth aspects.

In the twelfth aspect of the invention, there is provided an optical element made by precision press molding an optical glass as defined in any of the first to tenth aspects.

BEST MODE FOR CARRYING OUT THE INVENTION

Description will now be made about components which the optical glass of the present invention can comprise. Unless otherwise described, the composition ratio of each component will be expressed in mass %.

$SiO_2$ is an indispensable component which is very effective for increasing viscosity of the glass and improving resistance to devitrification and chemical durability of the glass. If, however, the amount of this component is insufficient, these effects cannot be achieved sufficiently whereas if the amount of this component is excessively large, the glass transition temperature (Tg) rises and the melting property of the glass is deteriorated. Therefore, the lower limit of the amount of this component should preferably be 0.1%, more preferably 1% and, most preferably be 3% and the upper limit of the amount of this component should be 8%, more preferably 6% and, most preferably be 5.5%. $SiO_2$ can be incorporated in the glass by using, e.g., $SiO_2$ as a raw material.

In the optical glass of the present invention which is a lanthanum glass, $B_2O_3$ is an indispensable component as a glass forming oxide. If, however, the amount of this component is insufficient, resistance to devitrification becomes insufficient whereas if the amount of this component is excessively large, chemical durability is deteriorated. Therefore, the lower limit of the amount of this component should preferably be 5%, more preferably 6% and, most preferably be 8% and the upper limit of this component should preferably be less than 20%, more preferably 19.5% and, most preferably be 19%. $B_2O_3$ can be incorporated in the glass by using, e.g., $H_3BO_3$ or $B_2O_3$ as a raw material.

$GeO_2$ is effective for increasing refractive index and improving resistance to devitrification. Since, however, this component is very expensive, the upper limit of the amount of this component should preferably be 10%, more preferably less than 4% and, most preferably, be 2%. $GeO_2$ can be incorporated in the glass by using, e.g., $GeO_2$ as a raw material.

$La_2O_3$ is an indispensable component which is effective for increasing refractive index and lowering dispersion. If, however, the amount of this component is insufficient, it is difficult to maintain the optical constants within the above described values whereas if the amount of this component is excessively large, resistance to devitrification is deteriorated. Therefore, the lower limit of the amount of this component should preferably be 15%, more preferably 18% and, most preferably be 20% and the upper limit of the amount of this component should preferably be 50%, more preferably less than 47% and, most preferably be 45%. $La_2O_3$ can be incorporated in the glass by using, e.g., $La_2O_3$, lanthanum nitrate or its hydrate as a raw material.

$Gd_2O_3$ is effective for increasing refractive index and lowering dispersion. If, however, the amount of this component is insufficient, the above described effects cannot be achieved sufficiently whereas if the amount of this component is excessively large, resistance to devitrification is deteriorated. Therefore, the lower limit of this component should preferably be 0.1% more preferably be 0.5% and, most preferably be 1% and the upper limit of the amount of this component should preferably be 30%, more preferably less than 28% and, most preferably be 25%. $Gd_2O_3$ can be incorporated in the glass by using, e.g., $Gd_2O_3$ as a raw material.

$Yb_2O_3$ is effective for increasing refractive index and lowering dispersion. If, however, the amount of this component is excessively large, resistance to devitrification is deteriorated. Therefore, the upper limit of the amount of this component should preferably be 5%, more preferably 4% and, most preferably be 3.5%. $Yb_2O_3$ can be incorporated in the glass by using, e.g., $Yb_2O_3$ as a raw material.

$TiO_2$ is effective for adjusting optical constants and improving resistance to devitrification. If, however, the amount of this component is excessively large, resistance to devitrification decreases rather than increases and internal transmittance at 400 nm is deteriorated. Therefore the upper limit of the amount of this component should preferably be 1%, more preferably 0.8% and, most preferably be 0.5%. $TiO_2$ can be incorporated in the glass by using, e.g., $TiO_2$ as a raw material.

$ZrO_2$ is an optional component which is effective for adjusting optical constants, improving resistance to devitrification and improving chemical durability. If, however, the amount of this component is excessively large, resistance to devitrification is deteriorated and it becomes difficult to maintain the glass transition temperature (Tg) at a desired low temperature. Therefore, the upper limit of the amount of this component should preferably be 10%, more preferably less than 8% and, most preferably be 7.5%. For achieving these effects easily, the amount of this component should preferably be 0.1% or over. $ZrO_2$ can be incorporated in the glass by using, e.g., $ZrO_2$ as a raw material.

$Nb_2O_5$ is an optional component which is effective for increasing refractive index and improving chemical durability and resistance to devitrification. If, however, the amount of this component is excessively large, resistance to devitrification decreases rather than increases and internal transmittance at 400 nm is deteriorated. Therefore, the upper limit of the amount of this component should preferably be 8%, more preferably 7% and, most preferably, be 6%. $Nb_2O_5$ can be incorporated in the glass by using, e.g., $Nb_2O_5$ as a raw material.

$Ta_2O_5$ is an indispensable component which is very effective for increasing refractive index and, improving chemical durability and resistance to devitrification. If, however, the amount of this component is insufficient, these effects cannot be achieved sufficiently whereas if the amount of this component is excessively large, it becomes difficult to maintain the above described optical constants. Therefore, lower limit of the amount of this component should preferably be more than 10%, more preferably 14% and, most preferably be more than 19% and the upper limit of the amount of this component should preferably be 25%, more preferably 24% and, most preferably be 23%. $Ta_2O_5$ can be incorporated in the glass by using, e.g., $Ta_2O_5$ as a raw material.

$WO_3$ is effective for adjusting optical constants and improving resistance to devitrification. If, however, the amount of this component is excessively large, resistance to devitrification and transmittance in the short wavelength region of the visible ray region are deteriorated. Therefore, the upper limit of the amount of this component should preferably be 10%, more preferably 8% and, most preferably, be 6%. $WO_3$ can be incorporated in the glass by using, e.g., $WO_3$ as a raw material.

ZnO is effective for lowering the glass transition temperature (Tg) and improving chemical durability. If, however, the amount of this component is excessively large, resistance to devitrification is deteriorated. Therefore, the upper limit of the amount of this component should preferably be 15%, more preferably 13% and, most preferably be 10%. For achieving these effects easily, the amount of this component should preferably be 0.1 or over. ZnO can be incorporated in the glass by using, e.g., ZnO or $ZnF_2$ as a raw material.

RO (one or more components selected from the group consisting of MgO, CaO, SrO and BaO) is effective for adjusting optical constants. If, however, the amount of this component is excessively large, resistance to devitrification is deteriorated. Therefore, the upper limit of the amount of this component should preferably be 10%, more preferably 5% and, most preferably be 3%. RO can be incorporated in the glass by using, e.g., MgO, CaO, SrO or BaO, or its carbonate, nitrate or hydroxide as a raw material.

$Li_2O$ is an indispensable component which is effective for lowering the glass transition temperature (Tg) substantially and facilitating melting of mixed glass materials. If, however, the amount of this component is insufficient, these effects cannot be achieved sufficiently whereas if the amount of this component is excessively large, resistance to devitrification is sharply deteriorated and chemical durability is also deteriorated. Therefore, the lower limit of the amount of this component should preferably be more than 0.5%, more preferably 0.6% and, most preferably be 1% and the upper limit of the amount of this component should preferably be less than 3%, more preferably 2.5%. % and, most preferably be 2%. $Li_2O$ can be incorporated in the glass by using, e.g., $Li_2O$, $Li_2CO_3$, LiOH or $LiNO_3$ as a raw material.

$Sb_2O_3$ may be optionally added for defoaming during melting of the glass. If the amount of this component is excessive, transmittance in the short-wave region of the visible ray region is deteriorated. Therefore, the upper limit of the amount of this component should preferably be 1%, more preferably 0.8% and, most preferably, be 0.5%.

F is effective for lowering glass transition temperature (Tg) while lowering dispersion of the glass and improving resistance to devitrification. Particularly by adding F with $La_2O_3$, the effect of achieving the above described optical constants and lowering glass transition temperature (Tg) can be achieved.

If the total amount of F contained in a fluoride or fluorides of a metal element or elements contained in the above oxides is excessively large, the amount of volatilization of F increases with resulting difficulty in obtaining homogeneous glass. Therefore, the upper limit of F should preferably be 6%, more preferably 5.5% and, most preferably be 5%. Particularly, for achieving the above described effects easily, the amount of F should preferably be 0.1% or over.

In the present specification, the term "calculated on oxide basis" means that, assuming that oxides, complex salts, metal fluorides etc. which are used as raw materials of the glass compositions of the optical glass of the present invention have all been decomposed and converted to oxides during the melting process, each component of the glass comprises a particular ratio to the total weight of the converted oxides which is 100 mass %.

The above described raw materials used in the respective components of the glass have been cited for illustrative purpose only and raw materials which can be used for the glass of the present invention are not limited to the above described oxides etc. but can be selected from known materials in accordance with various modifications of manufacturing conditions for manufacturing the glass.

The inventors of the present invention have found that, by adjusting the ratio of the amount of $Ta_2O_5$ to the amount of $Gd_2O_3$ to a predetermined value, chemical durability, internal transmittance at the wavelength of 400 nm and viscosity at liquidus temperature are improved while the optical constants of the above described ranges are maintained. More specifically, the ratio of $Ta_2O_5/Gd_2O_3$ should preferably be 1.9 or over, more preferably 2.2 or over and, most preferably be 2.5 or over. Chemical durability in this specification means water resistance and acid resistance respectively measured in accordance with the Powder Method of Japanese Optical Glass Industrial Standard and acid resistance measured in accordance with the ISO method, particularly the ISO method.

The inventors of the present invention have found that, by adjusting the ratio of the amount of $Ta_2O_5$ to the total amount of $Y_2O_3$, $La_2O_3$, $Gd_2O_3$ and $Yb_2O_3$ to a predetermined value, chemical durability, internal transmittance at the wavelength of 400 nm and viscosity at liquidus temperature are improved while the optical constants of the above described ranges are maintained. More specifically, the ratio of $Ta_2O_5/(Y_2O_3+La_2O_3+Gd_2O_3+Yb_2O_3)$ should preferably be 0.3 or over, more preferably 0.35 or over and, most preferably be 0.4 or over.

For maintaining desired optical constants and maintaining excellent weathering resistance, the value of $Ta_2O_5/Gd_2O_3$ and the value of $Ta_2O_5/(Y_2O_3+La_2O_3+Gd_2O_3+Yb_2O_3)$ should preferably be adjusted simultaneously to the above described desirable values.

As a result of studies for improving resistance to devitrification, i.e., stability during forming of the glass, in manufacturing a high-refractive low dispersion glass of the present composition system, the inventors of the present invention have succeeded in producing a high-refractive low-dispersion optical glass having excellent stability by adjusting the ratio of the amount of $Ta_2O_5$ to the total amount of $La_2O_3$, $Gd_2O_3$, $Yb_2O_3$ and $Y_2O_3$ to a predetermined value or over while restricting the upper limit of the total value of $La_2O_3$, $Gd_2O_3$, $Yb_2O_3$, $ZrO_2$, $Ta_2O_5$, $Nb_2O_5$ and $WO_3$ to a predetermined value.

More specifically, while the upper limit of the total amount of $La_2O_3$, $Gd_2O_3$, $Yb_2O_3$, $ZrO_2$, $Ta_2O_5$, $Nb_2O_5$ and $WO_3$ should preferably be 78% or below, more preferably be 75% or below and, most preferably be 73% or below, the lower limit of $Ta_2O_5/(Y_2O_3+La_2O_3+Gd_2O_3+Yb_2O_3)$ should preferably be 0.3, more preferably be 0.35 and, most preferably be 0.4.

By adding a small amount of $Lu_2O_3$ in the composition of the present invention, resistance to devitrification can be improved. Since, however, raw material of $Lu_2O_3$ is so expensive that addition of excessive amount of this component increases the production cost and therefore is not practical and, further, it deteriorates resistance to devitrification rather than improves it. Therefore, the upper limit of this component should preferably be less than 0.5% and more preferably be 0.3% and, most preferably, this component should not be added at all.

$Al_2O_3$ is effective for improving chemical durability. If the amount of this component is excessively large, resistance to devitrification is deteriorated. Therefore, the upper limit of this component should preferably be 5%, more preferably be less than 4% and, most preferably, be 2%.

The glass may comprise $Hf_2O_3$, $SnO_2$, $Ga_2O_3$, $Bi_2O_3$ and BeO. Since $Hf_2O_3$ and $Ga_2O_3$ are expensive materials, use of these components increases the manufacturing cost and it is not practical to use these components in commercial production. As to $SnO_2$, there is likelihood that, when glass materials are melted in a platinum crucible or a melting furnace which is formed with platinum in a portion which comes into contact with molten glass, tin of Sn is alloyed with platinum and heat resisting property of the alloyed portion is deteriorated with resulting making of a hole in the alloyed portion and leakage of the molten glass from the hole. $Bi_2O_3$ and BeO have the problem that these components adversely affect the environment and therefore impose a heavy burden to the environment. Accordingly, the upper limit of the amount of each of these components should preferably be less than 0.1%, more preferably 0.05% and, most preferably these components should not be added at all.

$Y_2O_3$ has a problem of deteriorating resistance to devitrification significantly. Therefore, the upper limit of this component should preferably be less than 0.1%, more preferably 0.05% and, most preferably, should not be added at all.

Description will now be made about components which the optical glass of the present invention should not comprise.

A lead compound not only has the problem that it tends to be fused with the mold during precision press molding, but has the problem that steps must be taken for protecting the environment not only in production of the glass but also in cold processing such as polishing and waste of the glass and therefore it imposes a heavy burden to the environment. The lead compound therefore should not be added to the optical glass of the present invention.

$As_2O_3$, cadmium and thorium adversely affect the environment and therefore impose a heavy burden to the environment. These components therefore should not be added to the optical glass of the present invention.

$P_2O_5$ tends to deteriorate resistance to devitrification when it is added to the glass and, therefore, it is not preferable to add $P_2O_5$ to the optical glass of the present invention.

As to $TeO_2$, there is likelihood that, when glass materials are melted in a platinum crucible or a melting furnace which is formed with platinum in a portion which comes into contact with molten glass, tellurium of $TeO_2$ is alloyed with platinum and heat resisting property of the alloyed portion is deteriorated with resulting making of a hole in the alloyed portion and leakage of the molten glass from the hole. $TeO_2$ therefore should not be added to the optical glass of the present invention.

The optical glass of the present invention should preferably not comprise coloring components such as V, Cr, Mn, Fe, Co, Ni, Cu, Mo, Eu, Nd, Sm, Tb, Dy and Er. That is to say, these coloring components should not be intentionally added except for a case where these components are mixed as impurities.

Since the glass composition of the present invention is expressed in mass %, it cannot be directly expressed in mol %. A composition expressed in mol % of respective oxides existing in the glass composition satisfying the properties required by the present invention generally assumes the following values:

| | |
|---|---|
| SiO$_2$ | 0.5-22% |
| B$_2$O$_3$ | 10-less than 40% |
| La$_2$O3 | 8-25% |
| Gd$_2$O$_3$ | 0.1-15% |
| Ta$_2$O$_5$ | exceeding 3% up to 9% |
| Li$_2$O | exceeding 2.5% and less than 15% and |
| GeO$_2$ | 0-15% and/or |
| Yb$_2$O$_3$ | 0-2.5% and/or |
| TiO$_2$ | 0-1% and/or |
| ZrO$_2$ | 0-12% and/or |
| Nb$_2$O$_5$ | 0-4% and/or |
| WO$_3$ | 0-6% and/or |
| ZnO | 0-30% and/or |
| RO | 0-10% |
| where RO is one or more components selected from MgO, CaO, SrO and BaO and/or | |
| Sb$_2$O$_3$ | 0-1% and |
| fluoride or fluorides of a metal element or elements contained in the above oxides, a total amount of F contained in the fluoride or fluorides being 0-40% | |

Description will now be made about the properties of the optical glass of the present invention.

As described above, the optical glass of the present invention should preferably have, from the standpoint of usefulness in the optical design, optical constants of a refractive index (nd) exceeding 1.85 and an Abbe number (vd) of 36 or over, more preferably a refractive index (nd) within a range exceeding 1.85 up to 1.90 and an Abbe number (vd) within a range from 36 to 45 and, most preferably, a refractive index (nd) within a range from 1.851 to 1.89 and an Abbe number (vd) within a range from 38 to 43.

In the optical glass of the present invention, an excessively high Tg tends to cause, as described previously, deterioration in the mold in conducting precision press molding. In the optical glass of the present invention, therefore, the upper limit of Tg should preferably be 630° C., more preferably 625° C. and, most preferably, be 620° C.

Yield point At should preferably be 680° C., more preferably 675° C. and, most preferably be 670° C. or below.

If chemical durability is deteriorated in the optical glass of the present invention, fading takes places by processing such as lapping and polishing and fading also tends to take place in cases of storing a lens preform material or mold pressed lenses. Therefore, water resistance measured in accordance with the Powder Method of Japanese Optical Glass Industrial Standard should preferably be Class 2 and more preferably be Class 1, acid resistance measured in accordance with the Powder Method of Japanese Optical Glass Industrial Standard should preferably be Class 3 to Class 1, more preferably Class 2 to Class 1 and, most preferably, be Class 1, and acid resistance measured in accordance with the ISO method should preferably be Class 4 to Class 1, more preferably Class 3 to Class 1, more preferably Class 2 to Class 1 and, most preferably, be Class 1.

Transmittance in the visible ray region is particularly important in the optical glass of the present invention and excellent internal transmittance at 400 nm is required. Therefore, it should preferably be 90% or over, more preferably 91% or over and, most preferably, be 92% or over.

In the optical glass of the present invention, liquidus temperature should preferably be 1160° C. or below for realizing stable production. More preferably, the liquidus temperature should be 1140° C. or below and, most preferably, be 1120° C. or below for enabling widening of the range in which stable production is possible and lowering melting temperature of the glass and thereby reducing energy consumed for production.

Liquidus temperature was determined in such a manner that, when a glass specimen of 30 cc is put in a platinum crucible and completely melted at 1250° C., then the temperature is lowered to a predetermined temperature and then the glass is held at this temperature for one hour, and then the glass is taken out of the crucible and presence or absence of crystals on the surface and inside of the glass is immediately observed, the lowest temperature at which presence of crystals is not observed is defined to be "liquidus temperature". The "predetermined temperature" in this case means a range of temperature which is set at the interval of every 20° C. within a range from 1180° C. to 1000° C.

As described previously, the optical glass of the present invention can be used as a preform for press molding or, alternatively, molten glass can be directly pressed. In a case where it is used as a preform, the method for manufacturing the preform and the manner of precision press molding are not particularly limited but known manufacturing method and known precision press molding method can be used. As a method for manufacturing a preform, a preform can be made in a manner as described in the gob forming method disclosed in Japanese Patent Application Laid-open Publication No. Hei 8-319124 or a preform can be made directly from molten glass as described in the manufacturing method and apparatus of an optical glass disclosed in Japanese Patent Application Laid-open Publication No. Hei 8-73229. A preform can also be made by cold processing a strip material.

In a case where a preform is made by dripping molten glass by using the optical glass of the present invention, if viscosity of the molten glass is too low, striae tends to occur in the preform whereas if viscosity is too high, cutting of glass by weight and surface tension of dripping glass becomes difficult.

Accordingly, for producing a high-quality preform stably, the lower limit of logarithm log η of viscosity (dPa·s) should preferably be 0.4, more preferably 0.5 and, most preferably be 0.6 and the upper limit of the logarithm log η should preferably be 2.0, more preferably 1.8 and, most preferably be 1.6.

Although the method of precision press molding a preform is not limited, a method as disclosed in Japanese Patent Publication No. Sho 62-41180, Method for Forming an Optical Element, may for example be used.

EXAMPLES

Examples of the present invention will now be described, though the present invention in no way is limited by these examples.

Table 1 shows compositions of Example No. 1 to No. 5 of the optical glass of the present invention together with their refractive index (nd), Abbe number (vd), glass transition temperature (Tg), yield point (At), water resistance RW(P) according to the Powder Method, acid resistance RA(P) according to the Powder Method, acid resistance SR according to the ISO method, internal transmittance at 400 nm, liquidus temperature and viscosity at the liquidus temperature. In the table, composition of the respective components is expressed in mass %.

TABLE 1

| | 1 (Reference Example) | 2 | 3 | 4 | 5 |
|---|---|---|---|---|---|
| $SiO_2$ | 5.5 | 3.4 | 4.4 | 4.9 | 5.4 |
| $B_2O_3$ | 12.4 | 17.5 | 15.5 | 15.5 | 15.5 |
| $La_2O_3$ | 39 | 37.6 | 36.6 | 37.6 | 37.6 |
| $Gd_2O_3$ | 7.5 | 7 | 7 | 7 | 7 |
| $Yb_2O_3$ | | | 1 | | |
| $ZrO_2$ | 6 | 6 | 6 | 6 | 6 |
| $Nb_2O_5$ | 1 | 2 | 2 | 2 | 2 |
| $Ta_2O_5$ | 19.5 | 18.5 | 18.5 | 18.5 | 18.5 |
| $WO_3$ | | 1.5 | 1.5 | 1.5 | 1.5 |
| $ZnO$ | 6 | 5.4 | 6.4 | 5.4 | 5.4 |
| $Li_2O$ | 1 | 1 | 1 | 1.5 | 1 |
| $Sb_2O_3$ | 0.1 | 0.1 | 0.1 | 0.1 | 0.1 |
| $GeO_2$ | 2 | | | | |
| F | 1.8 | | | | |
| Total | 100 | 100 | 100 | 100 | 100 |
| $Ta_2O_5/Gd_2O_3$ | 2.60 | 2.64 | 2.64 | 2.64 | 2.64 |
| $Ta_2O_5/(Y_2O_3+La_2O_3+Gd_2O_3+Yb_2O_3)$ | 0.42 | 0.41 | 0.41 | 0.41 | 0.41 |
| nd | 1.861 | 1.853 | 1.859 | 1.854 | 1.853 |
| vd | 40.5 | 40.4 | 40 | 40.2 | 40.3 |
| Tg(° C.) | 605 | 612 | 608 | 599 | 615 |
| At(° C.) | 657 | 663 | 655 | 648 | 666 |
| RW | 1 | 1 | 1 | 1 | 1 |
| RA | 2 | 3 | 2 | 3 | 2 |
| SR | 3 | 4 | 3 | 3 | 3 |
| Internal transmittance (%) at 400 nm | 95 | 94.9 | 94.2 | 94.5 | 95.2 |
| Liquidus temperature(° C.) | 1160 | 1060 | 1080 | 1100 | 1060 |
| Viscosity log η (dPa · s) at liquidus temperature | 0.6 | 1 | 0.9 | 0.8 | 1.1 |

For manufacturing the glasses of Example No. 1 to No. 5 shown in Table 1, ordinary raw materials for an optical glass including oxides, hydroxides, carbonates, nitrates and fluorides were weighed and mixed so as to realize the composition ratio of the respective examples shown in Table 1. The raw materials were put in a platinum crucible and melted at a temperature within a range from 1100° C. to 1500° C. for three to five hours depending upon the melting property of the composition. After refining and stirring the melt for homogenization, the melt was cast into a mold and annealed to provide the glasses.

Refractive index (nd) and Abbe number (vd) of the glasses were measured with respect to glasses which were obtained by setting the rate of lowering of annealing temperature at −25° C./Hr.

Glass transition temperature (Tg) of the glasses was measured in accordance with the Japanese Optical Glass Industrial Standard JOGIS08-[2003] "Measuring Method of Thermal Expansion of Optical Glass". A specimen having length of 50 mm and diameter of 4 mm was used as a test specimen.

Yield point (At) was measured in the same manner as in measuring glass transition temperature (Tg), and a temperature at which stretching of the glass ceased and shrinking of the glass started was adopted as yield point.

Water resistance RW(P) according to the Powder Method was measured in accordance with Japanese Optical Glass Industrial Standard JOGIS06-[1999]. More specifically, glass crushed to particle size of 425 μm-600 μm was taken by specific gravity in grams and put in a platinum basket. The platinum basket was put in a round-bottom flask made of quartz containing pure water (pH of 6.5 to 7.5) and treated for 60 minutes in a boiled water bath. Then, the amount of reduced mass (wt %) of the treated powder glass was calculated and classified according to the following classification: When the reduction rate was less than 0.05%, the water resistance was ranked as Class 1. When the reduction rate was 0.5% and over and less than 0.10%, the water-property was ranked as Class 2. When the reduction rate was 0.10% and over and less than 0.25%, the water resistance was ranked as Class 3. When the reduction rate was 0.25% and over and less than 0.60%, the water resistance was ranked as Class 4. When the reduction rate was 0.60% and over and less than 1.10%, the water resistance was ranked as Class 5. When the reduction rate was 1.10% and over, the water resistance was ranked as Class 6.

Acid resistance RA(P) according to the Powder Method was measured in accordance with Japanese Optical Glass Industrial Standard JOGIS06-[1999]. More specifically, glass crushed to particle size of 425 μm-600 μm was taken by specific gravity in grams and put in a platinum basket. The platinum basket was put in a round-bottom flask made of quartz containing 0.01N nitric acid aqueous solution and treated for 60 minutes in a boiled water bath. Then, the amount of reduced mass (wt %) of the treated powder glass was calculated and classified according to the following classification: When the reduction rate was less than 0.20%, the acid resistance was ranked as Class 1. When the reduction rate was 0.20% and over and less than 0.35%, the acid-property was ranked as Class 2. When the reduction rate was 0.35% and over and less than 0.65%, the acid resistance was ranked as Class 3. When the reduction rate was 0.65% and over and less than 1.20%, the acid resistance was ranked as Class 4. When the reduction rate was 1.20% and over and less than 2.20%, the acid resistance was ranked as Class 5. When the reduction rate was 2.20% and over, the acid resistance was ranked as Class 6.

Acid resistance SR was determined by conducting a test in accordance with the ISO method acid-proof ISO8424:1987 (E). More specifically, a glass specimen of 30 mm×30 mm×2 mm polished on six surfaces was put in a predetermined solution at 25° C. by hanging the specimen with a platinum line and was treated for predetermined lengths of time (10 minutes, 100 minutes, 16 hours and 100 hours). After the treatment, reduction in mass of the specimen was weighed and time required for eroding a glass layer having thickness of 0.1 μm was calculated by using the formula described below. In this calculation, value which was obtained by minimum test time in which the mass reduction per one specimen became 1 mg or over was used. In the case of treatment of 100 hours, if the mass reduction did not exceed 1 mg by the treatment of 100 hours, calculation was made by using the value available under this condition. In a case of using nitric acid solution of pH 0.3 was used as the predetermined solution, acid resistance was ranked as Class 1 when time required for eroding the glass layer having thickness of 1 μm exceeded 100 hours, ranked as Class 2 when this time was 10 hours to 100 hours, ranked as Class 3 when this time was 1 hour to 10 hours and ranked as Class 4 when this time was 0.1 hour to 1 hour. In a case of less than 0.1 hour, acid resistance was ranked as Class 5 when acetic acid buffer solution of pH 4.6 was used as the predetermined solution and time required for eroding the glass layer having thickness of 1 μm exceeded 10 hours, ranked as Class 51 when this time was 1 hour to 10 hours, ranked as Class 52 when this time was 1 hour to 0.1 hour, and ranked as Class 53 when this time was less than 0.1 hour. In the ISO method, subdivision number is affixed depending upon state of change of the glass surface after the treatment but such subdivision number is omitted in this specification.

$$t_{0.1} = t_e \cdot d \cdot S / ((m_1 - m_2) \cdot 100)$$

$t_{0.1}$: time required for eroding a glass layer having thickness of 1 μm (h)
$t_0$: time for treatment (h)
d: specific gravity
S: surface areas ($cm^2$) of the specimen
$m_1 - m_2$: amount of reduction in mass of the specimen (mg)

Internal transmittance was calculated by using the following formula on the basis of transmittance including reflection loss of samples having thickness of 10 mm and 50 mm. Internal transmittance was calculated on the basis of 10 mm.

$$\tau = exp[\{ln(T2/T1)/(t2-t1)\} \times l]$$

τ: internal transmittance
T2: transmittance including reflection loss of the specimen having thickness of 10 mm
T1: transmittance including reflection loss of the specimen having thickness of 50 mm
t2: thickness of the specimen 10 mm
t1: thickness of the specimen 50 mm
l: 10 mm Liquidus temperature was determined in such a manner that, when a glass specimen of 30 cc is put in a platinum crucible and completely melted at 1250° C., the temperature is lowered to a predetermined temperature and then the glass is held at this temperature for one hour, and then the glass is taken out of the crucible and presence or absence of crystals on the surface and inside of the glass is immediately observed, the lowest temperature at which present of crystals is not observed is defined to be "liquidus temperature". The "predetermined temperature" in this case means a range of temperature which is set at the interval of every 20° C. within a range from 1180° C. to 1000° C.

Viscosity of the glass was measured by the ball pulling up method. Viscosity at liquidus temperature was calculated by using viscosity-temperature curve using the measured viscosity.

As shown in Table 1, the optical glasses of Example No. 1 to No. 5 of the present invention all have the above described optical constants (refractive index (nd) and Abbe number (vd)) and their glass transition temperature (Tg) is 630° C. or below and, therefore, these optical glasses are suitable for precision press molding. Moreover, since these optical glasses have excellent water resistance according to the Powder Method, acid resistance according to the Powder Method and acid resistance according to the ISO method, they have excellent chemical durability and, since liquidus temperature and logarithm log η of viscosity at the liquidus temperature of these optical glasses are within the above described desirable ranges, stable production of these optical glasses can be achieved.

INDUSTRIAL APPLICABILITY

As described in the foregoing, the optical glass of the present invention is a $SiO_2$—$B_2O_3$—$La_2O_3$—$Gd_2O_3$—$Ta_2O_5$—$Li_2O$ system glass which is free of Pb and As components, has refractive index (nd) exceeding 1.85, Abbe number (vd) of 36 or over and glass transition temperature (Tg) of 630° C. or below and, therefore, it is suitable for precision press molding and has excellent industrial applicability.

Further, since the optical glass of the present invention has excellent chemical durability, there is little likelihood of occurrence of fading in lapping and polishing to produce lens preform and storing lens preform. Furthermore, since the optical glass of the present invention has low liquidus temperature and high viscosity at the liquidus temperature, stable production can be achieved.

The invention claimed is:

1. An optical glass having optical constants of a refractive index (nd) exceeding 1.85 and an Abbe number (vd) of 40 or over and comprising, in mass % calculated on oxide basis, 3-8% $SiO_2$, 5-19.5% $B_2O_3$, 15-50% $La_2O_3$, 0.1-25% $Gd_2O_3$, exceeding 10% up to 25% $Ta_2O_5$, 1.5-6% $WO_3$, 0-1% $TiO_2$, 0.1 or over ZnO and $Li_2O$, said optical glass being substantially free of Pb and As, and having glass transition temperature (Tg) of 630° C. or below, wherein the total amount of $La_2O_3$, $Gd_2O_3$, $Yb_2O_3$, $ZrO_2$, $Ta_2O_5$, $Nb_2O_5$ and $WO_3$ is 78% or below, log η which is logarithm of viscosity η at liquidus temperature is 0.8 or over, and liquidus temperature is 1100° C. or below.

2. The optical glass as defined in claim 1 wherein waterproof property of glass measured in accordance with Powder Method of Japan Optical Glass Industry Standard is Class 1 or Class 2, acid-proof property of glass measured in accordance with Powder Method of Japan Optical Glass Industry Standard is Class 1 to Class 3 and acid-proof property measured in accordance with ISO test method is Class 1 to Class 4.

3. The optical glass as defined in claim 1 wherein internal transmittance at wavelength of 400 nm is 90.0% or over.

4. The optical glass as defined in claim 1 wherein $Ta_2O_5/Gd_2O_3$ expressed in mass % calculated on oxide basis is 1.9 or over and/or $Ta_2O_5/(Y_2O_3+La_2O_3+Gd_2O_3+Yb_2O_3)$ expressed in mass % calculated on oxide basis is 0.3 or over.

5. The optical glass as defined in claim 1 wherein $Ta_2O_5/(Y_2O_3+La_2O_3+Gd_2O_3+Yb_2O_3)$ expressed in mass % calculated on oxide basis is 0.3 or over.

6. The optical glass as defined in claim 1 comprising in mass % calculated on oxide basis:

| | |
|---|---|
| $SiO_2$ | 3-8%, |
| $B_2O_3$ | 5-less than 19.5%, |
| $La_2O_3$ | 15-50%, |
| $Gd_2O_3$ | 0.1-25%, |
| $Ta_2O_5$ | exceeding 10% up to 25%, |
| $Li_2O$ | exceeding 0.5% and less than 3%, |
| $WO_3$ | 1.5-6%, |
| ZnO | 0.1-15%, |

| | |
|---|---|
| $GeO_2$ | 0-10%, |
| $Yb_2O_3$ | 0-5%, |
| $TiO_2$ | 0-1%, |
| $ZrO_2$ | 0-10%, |
| $Nb_2O_5$ | 0-8%, |
| $WO_3$ | 0-10%, |
| ZnO | 0-15%, |
| RO | 0-10%, | where RO is one or more components selected from MgO, CaO, SrO and BaO

| | |
|---|---|
| $Sb_2O_3$ | 0-1%, and | fluoride or fluorides of a metal element or elements contained in the above oxides, a total amount of F contained in the fluoride or fluorides being 0-6%.

7. The optical glass as defined in claim 1 further comprising 0 to less than 0.5% $Lu_2O_3$, 0 to less than 0.1% $Y_2O_3$ and 0-5% $Al_2O_3$.

8. The optical glass as defined in claim 1, wherein the optical glass is a preform for precision press molding.

9. The optical glass as defined in claim 1, wherein the optical glass is included in an optical element made by precision press molding.

10. The optical glass as defined in claim 1, wherein the optical glass is an optical element made by precision press molding.

* * * * *